March 30, 1926.
J. T. DICKSON
FLUID PRESSURE CLUTCH
Filed Feb. 1, 1922
1,578,815
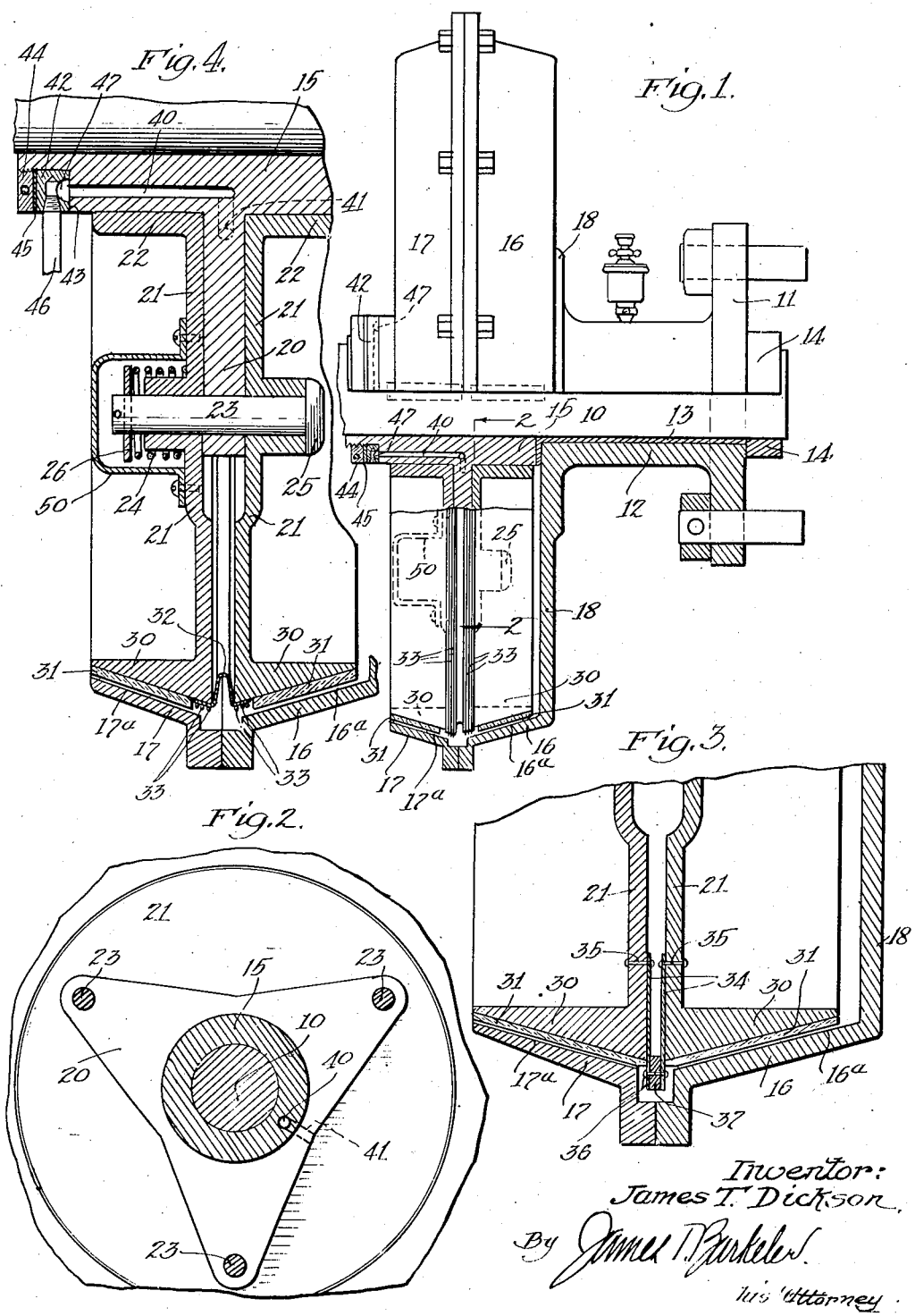
Inventor:
James T. Dickson,
By James T. Berkeley
his Attorney Patented Mar. 30, 1926.

1,578,815

UNITED STATES PATENT OFFICE.

JAMES T. DICKSON, OF LOS ANGELES, CALIFORNIA.

FLUID-PRESSURE CLUTCH.

Application filed February 1, 1922. Serial No. 533,470.

*To all whom it may concern:*

Be it known that I, JAMES T. DICKSON, a citizen of the United States, residing at Los Angeles, in the county of Los Angeles, State of California, have invented new and useful Improvements in Fluid-Pressure Clutches, of which the following is a detailed specification.

The invention, a specific form of which is herein described, has to do generally with clutch mechanisms; and although I herein explain the invention as embodied in one form of power transmission device it will be understood that the clutch of the present invention may be applied to various kinds and types of mechanism. And it will also be understood that the invention is not necessarily limited to the specific details of structure hereinafter explained, these details being set out for the purpose of enabling those skilled in the art to understand fully and thoroughly one form of device that embodies the invention and thereby to have a full and complete understanding of the invention itself.

I have previously been granted a Patent No. 1,048,299, dated December 24th, 1912, entitled "Pneumatic clutches" in which I have shown and described a form of fluid pressure clutch somewhat similar to the one concerned in this application; and the present invention embodies certain improvements over and above the older type of mechanism. In the type of mechanism shown in said patent the clutch action is unbalanced and the mechanism is subject to a certain amount of drag when the clutch is disengaged. It is a general object in the present invention to provide a clutch mechanism that is balanced in its action, so that all of its frictional clutch surfaces go into and out of action simultaneously and in equal degree; and so that there is and can be no dragging in the clutch mechanism when it is disengaged. These objects and others, and the corresponding accomplishments and features of my present invention will be best understood from the following detailed description of a specific form of device that embodies the invention, reference for this purpose being had to the accompanying drawings in which:

Fig. 1 is a view partly in elevation and partly in longitudinal central section showing my improved clutch mechanism;

Fig. 2 is a fragmentary cross section taken as indicated by line 2—2 on Fig. 1; and Fig. 3 is a fragmentary section showing a slight modification.

Fig. 4 is an enlarged section of a portion of Fig. 1.

In the drawings I have shown a type of clutch mechanism more particularly adapted for transmission mechanism; and in this particular embodiment of my invention I show a driven or a driving shaft at 10 and a driving or a driven member at 11. It will be readily understood of course that either the shaft 10 or the member 11 may be the driving member, but for clarity of description I will consider the shaft 10 as being the driving shaft and the member 11 the driven member. The member 11 has a hub 12 running with a bearing sleeve 13 on the shaft 10, and being confined endwise between a collar 14 and the hub 15 which will be hereinafter referred to. Hub 12 carries one of the frictional members of the clutch; and in this specific instance this frictional member is made up of two conical rims 16 and 17, rim 16 being carried on the flange 18 of hub 12 and rim 17 being bolted to rim 16, as illustrated. The interior conical faces 16$^a$ and 17$^a$ of these two rims form one set of friction surfaces for the clutch; and rims 16 and 17 are located in overhanging relation to flange 18 so that they also form an exterior housing within which the other parts of the clutch are contained.

The hub 15 is solidly mounted on shaft 10, for instance by being keyed to the shaft; and it carries a plate 20 which may be of any suitable configuration as for instance, triangular as shown in Fig. 2. At each side of plate 20 there is a movable disc 21, each disc having a hub 22 that is snugly but movably fitted upon hub 15, so that the discs may move longitudinally on the hub. In order to hold discs 21 normally in their contracted position, that is, against plate 20, I employ a number of bolts 23 and springs 24. Bolts 23 have heads 25 at one end and at the other end they carry discs or washers 26 under which the compression springs 24 are confined. As will be readily seen from the drawings without the necessity of any further description, the springs 24 with the assistance of bolts 23, will press the two discs 21 inwardly toward and against plate 20 with equal force and will oppose their outward movements with equal force; so that if fluid pressure is introduced between the two discs then they will be moved outwardly with equal forces and to equal distances. Bolts 23 are fitted to be easily longitudinally movable in plate 20 and in the left hand disc 21 so that the friction will be a minimum and so that there will be true equality of action as between the two discs. Furthermore, bolts 23 are made of sufficient size, and plate 20 of sufficient strength to make bolts 23 the rotative driving connection between discs 21 and plate 20 and thus between shaft 10 and discs 21.

Each disc 21 carries at its outer periphery a flange 30 with a conical outer surface. On each flange there may be mounted a cork or leather friction facing 31 adapted to frictionally contact and cooperate with the conical friction surfaces 16$^a$ and 17$^a$ when the two discs 21 are moved outwardly. Normally, when the discs are in the position shown in the drawings these facings 31 do not engage the friction surfaces 16$^a$ and 17$^a$ but are entirely free from them so that there is no drag in the clutch.

At the peripheries of the two discs 21 I employ some suitable means for forming a fluid tight joint. This, for instance, may be a flexible gasket 32 of leather or other suitable material whose edges are attached to the peripheries of the two discs by means of a wire winding or the like such as indicated at 33. In the modified form of device shown in Fig. 3 I may use two flexible or elastic annular metal plates as shown at 34, the inner edges of these plates being riveted or otherwise secured at 35 to the discs and the outer edges of the plates being secured together, as by riveting as shown at 36, and a gasket 37 being interposed. Any such method as this may be used for confining fluid pressure to the space between the two discs. The disc hubs 22 fit on hub 15 tightly enough to prevent any material loss of pressure there.

Fluid pressure of any kind may be employed for operating the clutch and this fluid pressure may be introduced into the space between the two discs through passages 40 and 41 which lead from the end of hub 15. At the end of hub 15 a stationary ported ring 42 is confined against shoulder 43 by a nut 44, suitable packing 45 being interposed between the nut and ring 42. The fluid pressure may be supplied through pipe 46 and from this pipe the fluid pressure is fed into an annular port or groove 47 which at all times communicates with passage 40. If so desired the opposite surfaces of plate 20 may be roughened so that the fluid pressure may have immediate access to substantially the whole of the inner opposed surfaces of discs 21 even when the discs are in their contracted positions. Or the plate 20 may be cut down in area as much as possible so as to make virtually nothing more than a spider of it; or both such expedients may be used. In any case, immediately the discs have moved slightly outwardly, the fluid pressure acts on the whole of their inner surfaces. These inner surfaces being comparatively large it is not necessary to employ a high fluid pressure in order to have a powerful clutch action. The pressure in the frictional faces is of course also increased by their conical form. Springs 24 are designed to be only strong enough to infallibly move clutch discs 21 to their contracted position. These springs may, if desired, be covered by metal or other caps 50 to protect them and also to prevent leakage around bolts 23. At the head ends of the bolts the heads may be accurately fitted, at their shouldering surfaces, upon the disc 21. For instance, a ground fit may be used at that point.

When fluid pressure is admitted to the clutch it will be seen that the two clutch discs will be moved outwardly with substantially equal forces and to substantially equal distances so that the two conical friction surfaces will be drawn into action simultaneously and to equal extents (the parts are of course initially designed and arranged so that the clutch discs in their contracted position are central with relation to the two conical friction surfaces 16$^a$ and 17$^a$). When the fluid pressure is relieved then the springs 24 act to bring discs 21 together; and acting upon the two discs equally and simultaneously relieve the pressure at the friction faces and simultaneously disengage the friction faces. Furthermore the springs act to disengage both friction faces positively; neither friction face is left in a position where it could drag on the driven friction face.

Having described a preferred form of my invention, I claim:

A clutch mechanism embodying a driving and a driven member, one of said members having oppositely arranged friction faces and the other having a hub carrying a central driving plate, two oppositely and longitudinally movable disks mounted at their centers to slide with a fluid tight fit on the hub on opposite sides of the central plate, said disks having friction faces adapted to be pressed outwardly against the friction faces of the first mentioned member, means to introduce fluid pressure between the disks an extensible fluid tight connection between the two disks at their peripheries, a bolt passing through the central driving plate and both disks and rotatively connecting the driving plate and disks while allowing the disks to move longitudinally, a spring around the bolt outside a disk and pressing on the disk, and a fluid-tight cover cap mounted on the outer face of the disk and covering both bolt and spring.

In witness that I claim the foregoing I have hereunto subscribed my name this 24 day of Jan. 1922.

JAMES T. DICKSON.